United States Patent [19]
Hadden, Jr.

[11] Patent Number: 5,133,587
[45] Date of Patent: Jul. 28, 1992

[54] SEAT

[76] Inventor: James R. Hadden, Jr., 13118 Roaring Springs, Dallas, Tex. 75240

[21] Appl. No.: 440,031

[22] Filed: Nov. 20, 1989

[51] Int. Cl.$^5$ .............................................. A47B 83/02
[52] U.S. Cl. .................................... 297/146; 297/232; 297/318; 297/191
[58] Field of Search ............... 297/232, 342, 343, 317, 297/318, 320, 483, 484, 146, 191, 163–166

[56] References Cited

U.S. PATENT DOCUMENTS

| | | | |
|---|---|---|---|
| 2,479,175 | 8/1949 | McArthur | 297/318 |
| 2,599,079 | 6/1952 | Tatom | 297/320 |
| 3,489,459 | 1/1970 | Katan, Sr. et al. | 297/316 |
| 3,572,829 | 3/1971 | Malitte | 297/317 |
| 3,734,562 | 5/1973 | Fourrey | 297/484 |
| 3,773,381 | 11/1973 | Brennan | 297/191 |
| 4,141,586 | 2/1979 | Goldner et al. | 297/191 |
| 4,375,300 | 3/1983 | Long et al. | 297/232 |
| 4,451,085 | 5/1984 | Franck et al. | 297/320 |
| 4,511,178 | 4/1985 | Brennan | 297/146 |

FOREIGN PATENT DOCUMENTS

| | | | |
|---|---|---|---|
| 495664 | 10/1950 | Belgium | 297/318 |
| 2632354 | 1/1977 | Fed. Rep. of Germany | 297/318 |
| 67235 | 4/1985 | Japan | 297/317 |

Primary Examiner—Kenneth J. Dorner
Assistant Examiner—Brian K. Green
Attorney, Agent, or Firm—W. Kirk McCord

[57] ABSTRACT

An improved adjustable seat having a supporting frame, a seat bucket type removable seat, and a connect-disconnect member disconnectably attaching the removable seat to the frame. The seat bucket and frame are provided with slides which permit relative change in attitude between the seat bucket and the frame in response to manipulation of seat reclining controls by the seat occupant. Included in the base frame are legs which are deformable under high acceleration-deceleration forces to absorb a portion of the energy resulting from the application of such excessive forces.

14 Claims, 13 Drawing Sheets

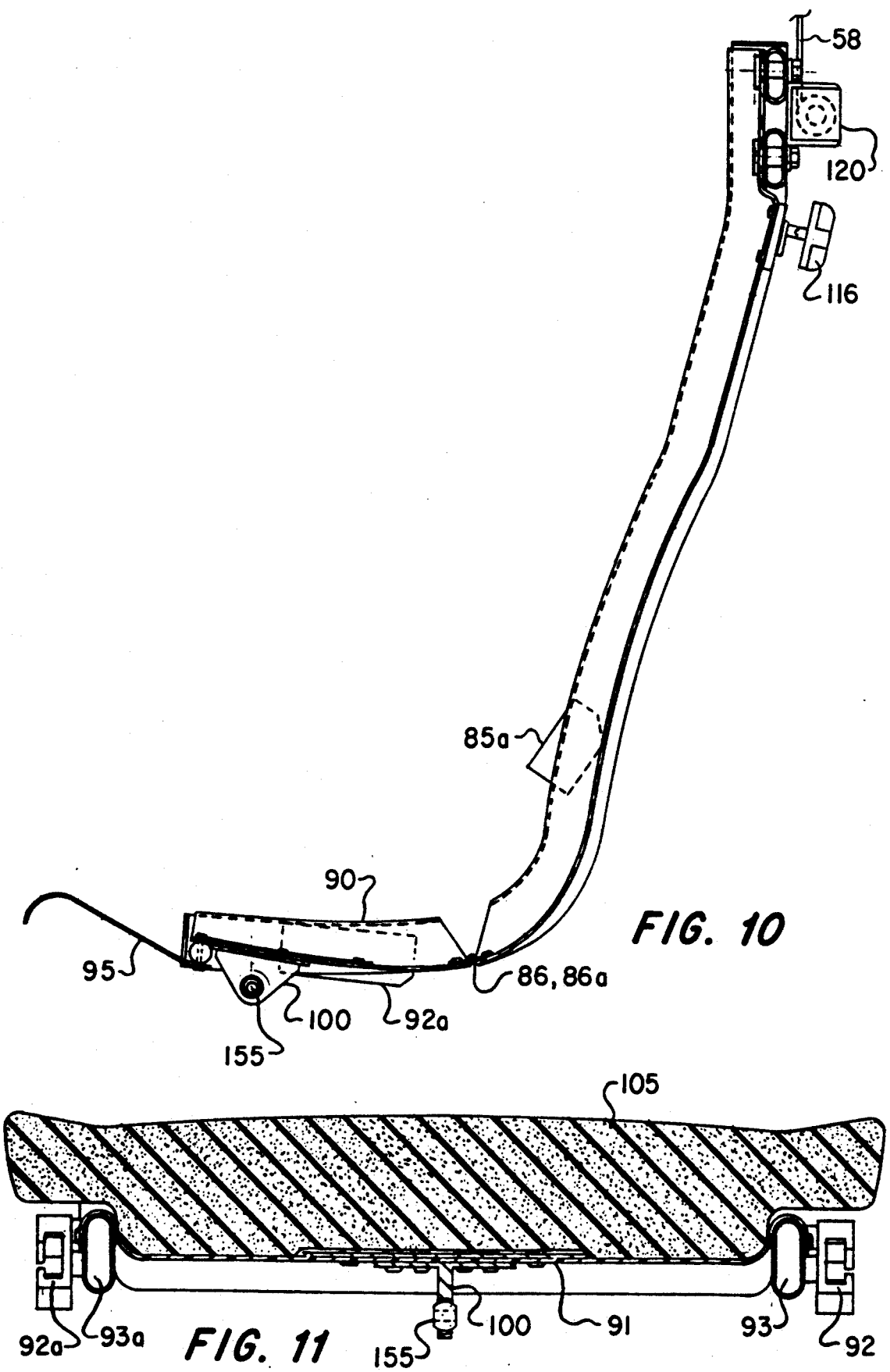

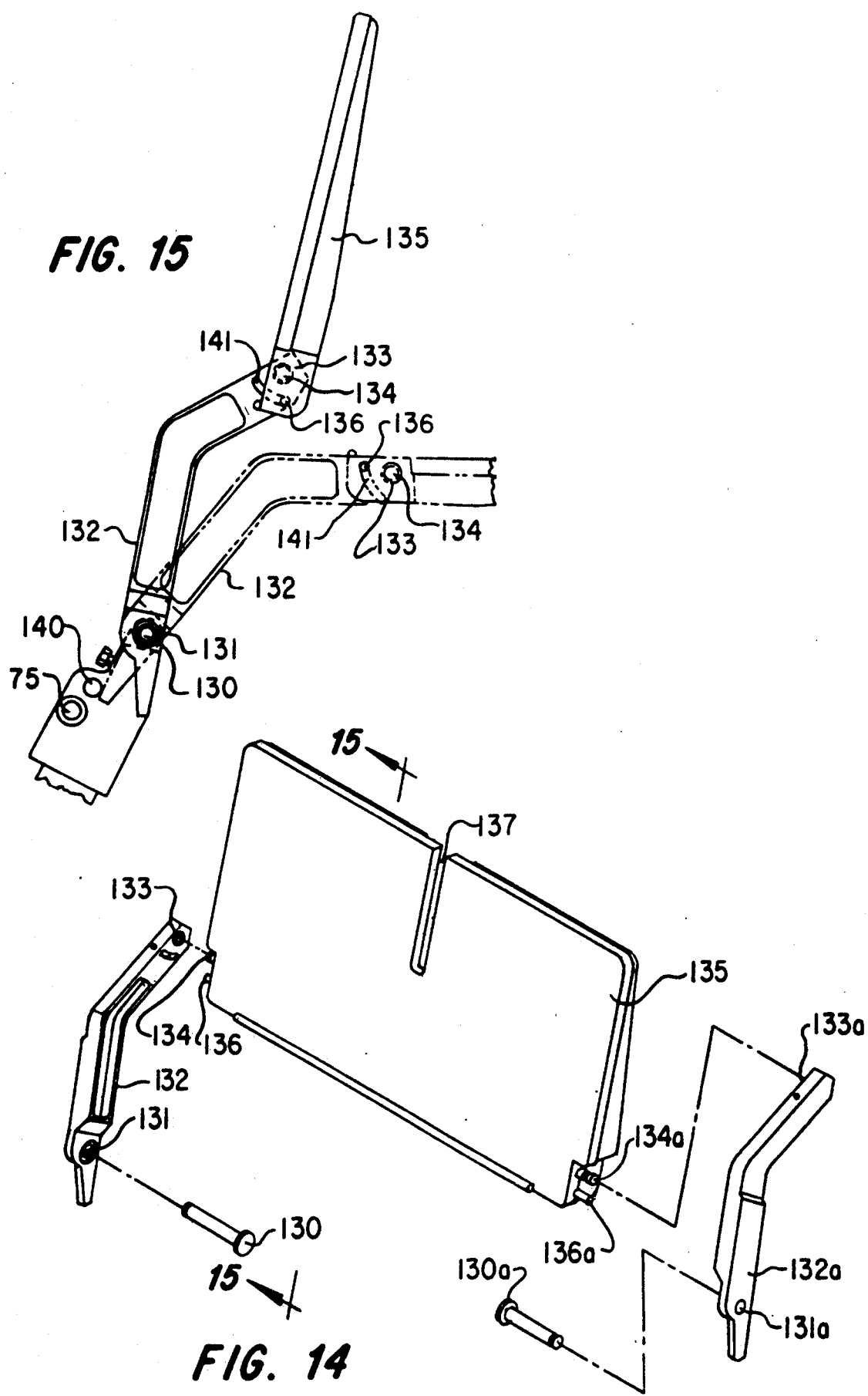

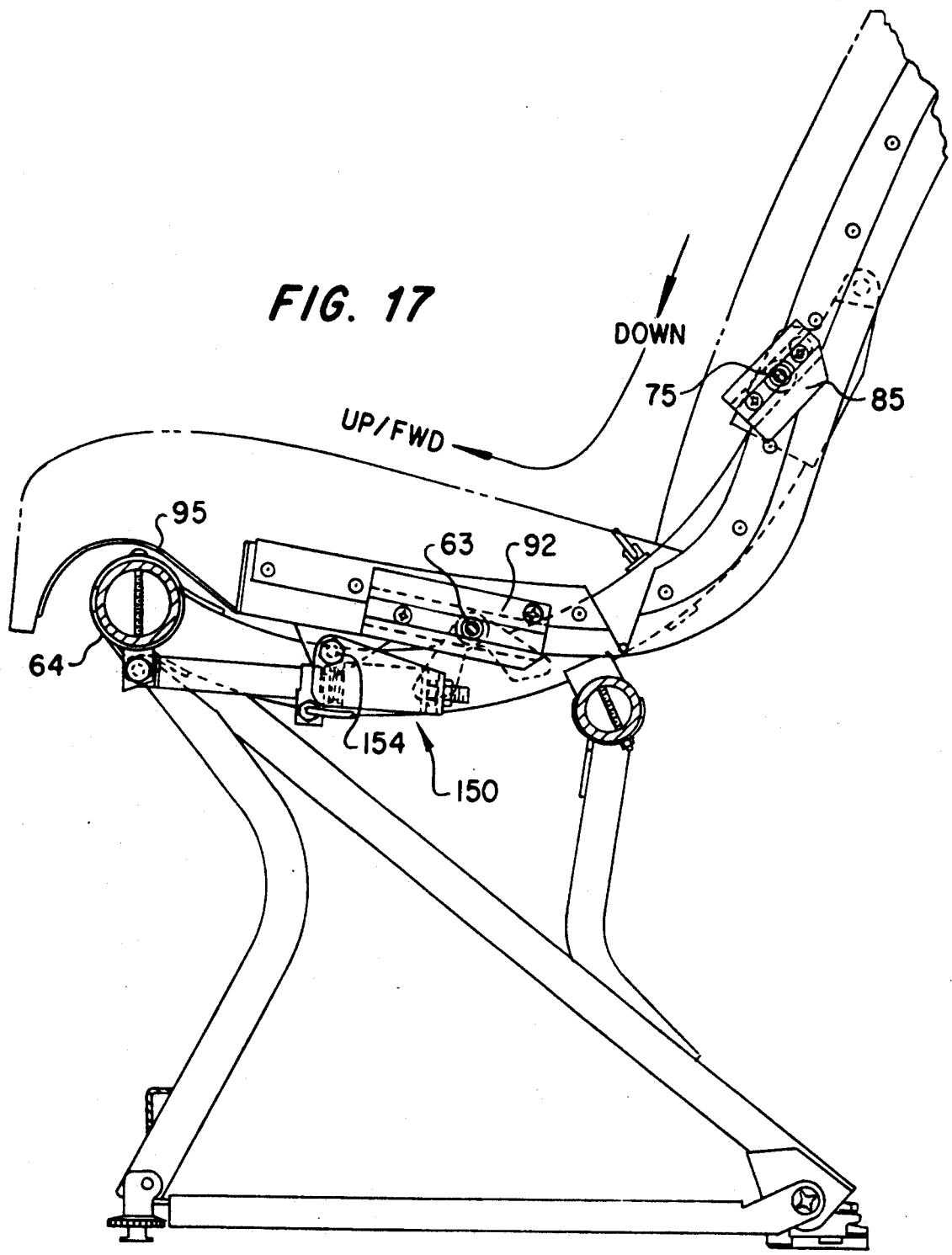

SEAT

BACKGROUND OF THE INVENTION

This invention relates to adjustable chair-type seats, and more particularly to such seats that include provisions for changes in passenger orientation.

A variety of adjustable seats have heretofore been proposed for human occupancy. These have included a variety of seating arrangements that have been configured to the human form, to provide comfort and support, both in the lower portion of the seat which bears the principal vertical load, as well as the back, which provides support for the upper portion of the human form.

Seating construction is particularly important in vehicular transport where not only comfort of the occupant is important but in which safety becomes paramount. Thus, there have been proposed a variety of vehicular seats which include considerations of both comfort and safety. Illustrative of such is the seating arrangement disclosed in U.S. Pat. No. 3,489,459, granted to Earl R. Katin, Sr. et al. on Jan. 13, 1970.

Transportation seats heretofore proposed have generally involved the provision of a stationary lower portion which is affixed to the main supporting surface. (e.g., compartment floor). Attached to and in swivelable association with such lower stationary portion is the upper backrest and support portion. Although such seats have found widespread use, they have presented certain problems, among which are limits on the degree of adjustment without encroaching inordinantly on adjacent space, limits on passenger comfort, and limitations on the food serving trays that typically are associated with such seats.

Although transportation seats generally have included a stationary lower seating portion, there have been limited proposals for rendering the lower seating portion movable with respect to the stationary undercarriage. Such proposals are illustrated by the disclosure of the aforementioned Katin patent. According to that proposal, the lower seat portion is made pivotable about a location near the front thereof, which location also presents a sliding connection to the stationary undercarriage; and a connection from a point forward of the pivot location to a point on the backrest portion above its pivotable connection to the stationary undercarriage results in a rearward and downward movement of the rear of the lower seating portion when the backrest portion is reclined. However, the back continues to swivel about a stationary point, thus limiting the extent of inclination without unduly encroaching on the space of the passenger immediately behind. Accordingly, there has continued to be a need for further improvements in such seats to provide for coordinated movement of both the lower and upper portions of the seat both with respect to the undercarriage and with respect to each other.

SUMMARY OF THE INVENTION

The present invention overcomes the limitations of the prior art through the provision of a combination of interactive members which permit coordinated movement (with respect to the stationary undercarriage) of the entire portion of the seat that normally is in contact with the torso of the occupant. In addition, in accordance with an alternate embodiment of the invention, provision is additionally made for an independent movement of the lower seating portion with respect to the upper backrest portion of the seat while both are moved relative to the stationary undercarriage so as to provide for versatility and flexibility in deployment. This is accomplished through the positioning of certain interactive parts at predetermined locations in the seat structure as will be identified from the detailed description below.

It is one general object of this invention to improve adjustable seats.

It is another object of the invention to render adjustable vehicular seats more impact resistant.

It is still another object of the invention to improve the safety for occupants of such seats when subjected to high acceleration or deceleration forces.

It is still another object of the invention to increase the degree of adjustability versus space required.

It is yet one further object of the invention to provide for reduced maintenance of such seats.

It is still another object of the invention to provide ready access and/or removability of the seating portion of adjustable seats to facilitate repair and maintenance.

Accordingly, in accordance with one feature of the invention, there are provided at predetermined locations, a pair of sliding attachments on both sides of each seat, thereby to facilitate seat adjustability while reducing corresponding encroachment on adjacent space.

In accordance with yet another object of the invention, the supporting undercarriage for each seat includes a pair of partially bent legs configured such that upon the application of forward or aft forces above a predetermined threshold, the legs either deform forward or to the rear so as to absorb energy, thereby tending to cushion acceleration/deceleration forces which are greater than 10 G.

In accordance with still another feature of the invention, the seat buckets are retained in assembly with the supporting undercarriage by the aforementioned pairs of guides plus a single additional bolt whereby disengagement and removal of the seat bucket can be readily accomplished by removal of a single bolt only, thereby contributing to ready removability and/or maintenance.

In accordance with still another feature of the invention, the seat buckets may be either single unitary assemblies or multiple articulated assemblies, and the identical undercarriage structure may be used for either, thereby improving versatility.

In accordance with yet a further feature of the invention, through the swivelable attachment of the lower seat portion to the backrest portion of the seat bucket through a piano-type hinge at the junction therebetween, the seat bucket may be formed of two principal sections which are adapted for relative angular movement with respect to each other, while continuing to provide for movement of the entire seat bucket assembly within the aforementioned guides, thereby contributing further to flexibility and utility.

In accordance with one additional feature of the invention, certain portions of the stationary undercarriage are assembled with the use of readily removable bolts instead of rivets, thereby improving facility of disassembly and maintenance.

In accordance with still one further feature of the invention, the orientation of the aforementioned sliding supports with respect to the seatback portion of the bucket facilitate the deployment of shoulder harness supplements to the conventional waist belts, and the lower ends of the shoulder harness are connected to anchors securely affixed to the undercarriage, thereby substantially improving seat occupant safety and increasing margins of survivability.

In accordance with another feature of the invention, the swivel position of the food service tray is located at the conventional arm rest swiveling location, thereby reducing the length of the tray supporting arms and contributing to utilization of usable space.

In accordance with still one further feature of the invention, a slot is provided in the upper part of the food tray, and a mating tee member is provided for cooperative communication with such slot, thereby rendering movement of the seat relatively independent of the tray.

These and other objects and features of the invention will be apparent from the following detailed description by way of two preferred embodiments, with reference to the drawings in which:

BRIEF DESCRIPTION OF THE DRAWINGS

FIG. 10 is a sectional view through the seat bucket of FIG. 8;

FIG. 11 is a sectional view through the lower bottom of the seat bucket of FIG. 8;

FIG. 14 is an exploded detailed view illustrating the preferred food tray mechanism;

FIG. 15 is a side elevational detailed view illustrating operation of the food tray in accordance with the principles of the invention.

FIG. 17 is a view similar to that of FIG. 18 but showing the seat bucket in the reclined mode.

DETAILED DESCRIPTION OF THE DRAWINGS

Figure 1:
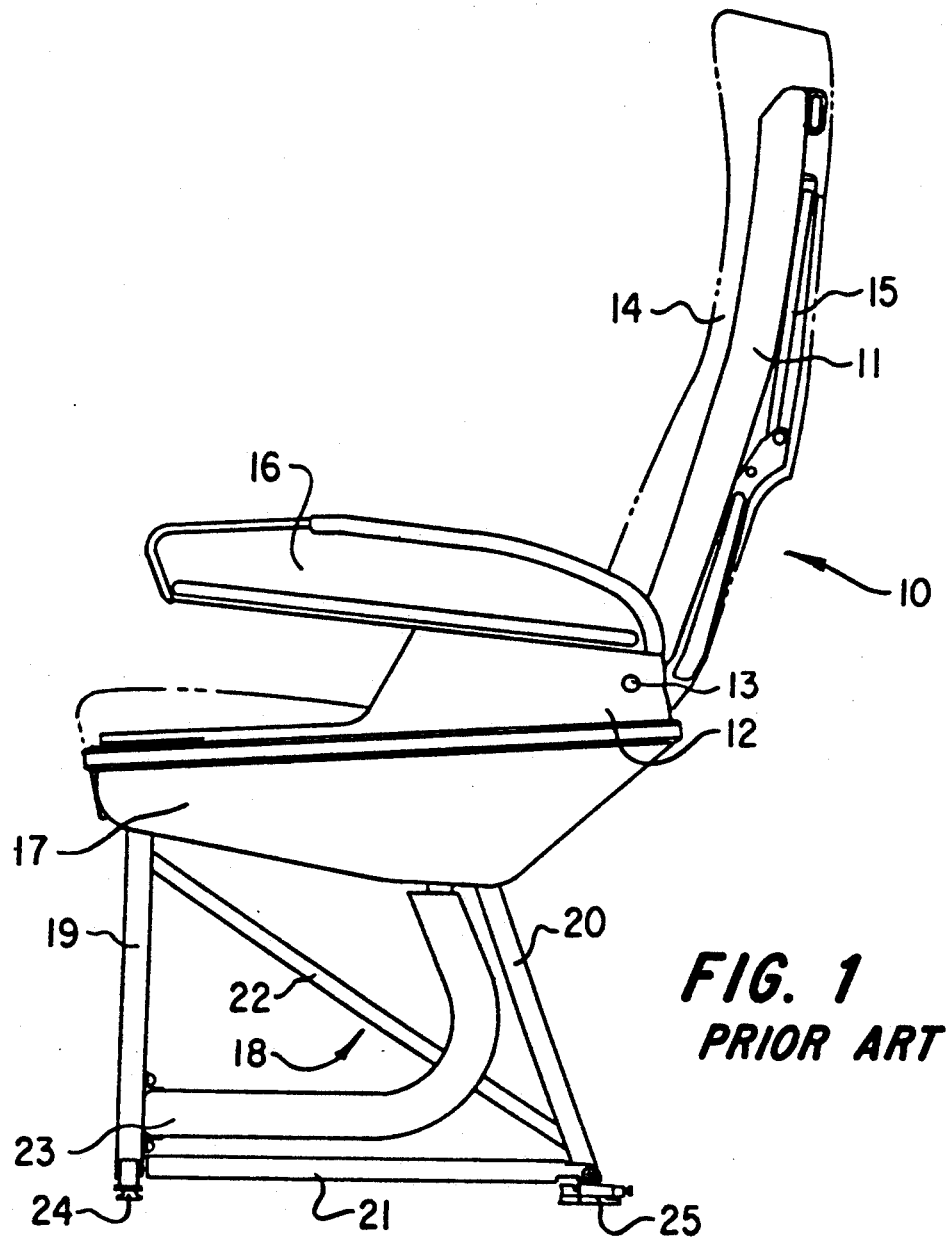
FIG. 1 is a side elevation view of a typical seat illustrative of the prior art.

Now turning to the drawings, and more particularly to FIG. 1 thereof, it will be observed that there is therein depicted a side elevation of a conventional prior art seat 10 according to the prior art. This seat includes two principal portions. These are the upper pivotable back portion 11 and the lower stationary seating portion 12. These are attached through pivot bolt 13 to retain them in assembly.

As will be evident from further reference to FIG. 1, the conventional seat of the prior art includes, in addition to backrest portion 14, food tray assembly 15, arm rest 16, lower plastic shroud 17, and undercarriage 18 comprising forward vertical member 19, rear inclined member 20, horizontal spreader 21, inclined strut 22, and baggage restraint bar 23.

FIG. 1 further illustrates conventional attachment and securing members 24 and 25 which are adapted to fit into mating seat tracks normally positioned in the floor of the cabin.

Figure 2:
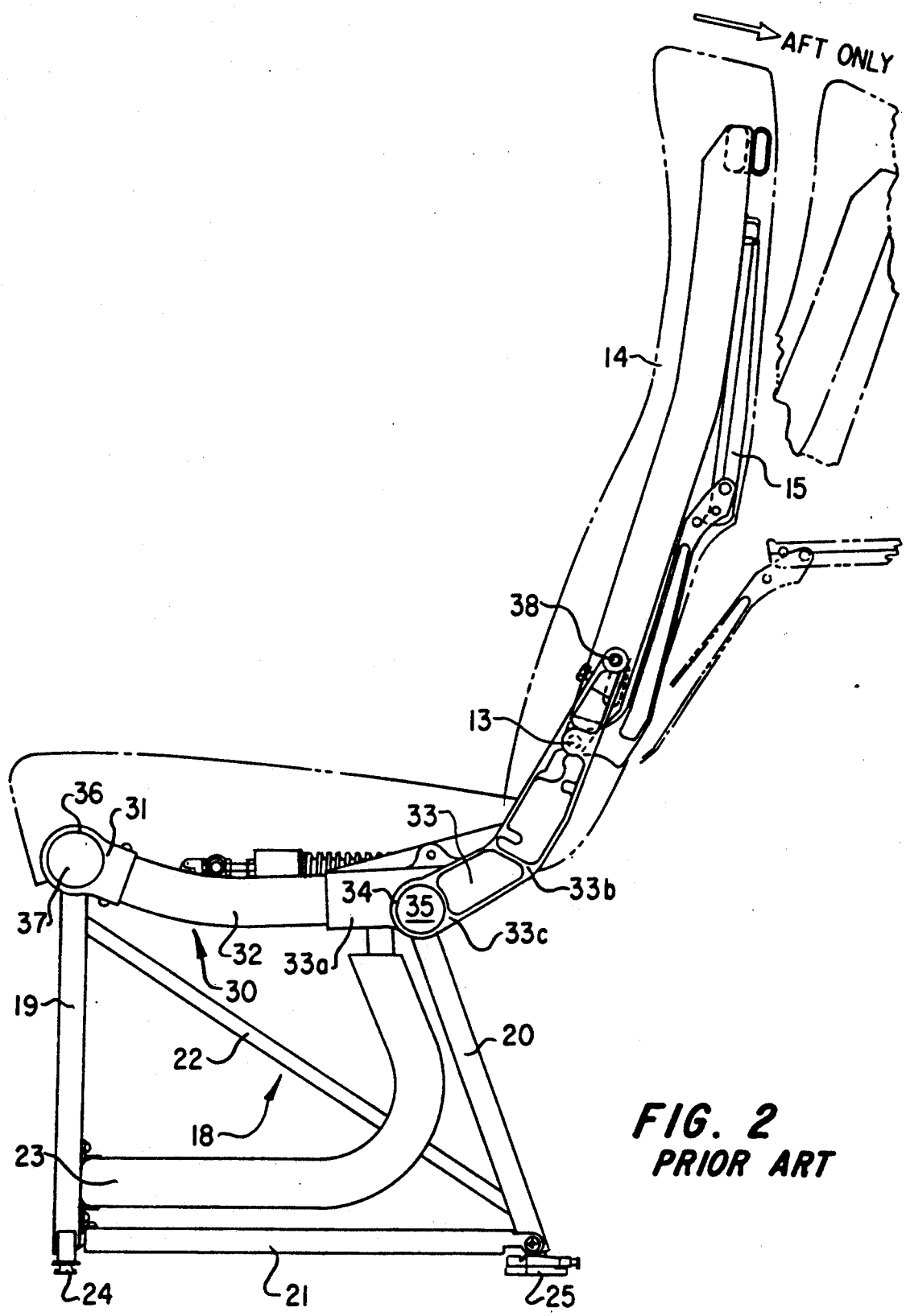
FIG. 2 is a partially schematic side elevation view depicting the mechanism of the seat of FIG. 1.

As mentioned above, FIG. 2 is a side elevational view depicting the mechanism of the seat of FIG. 1. In FIG. 2, the arm rest and lower plastic shroud have been removed so as to reveal the structural members in greater detail. Thus, for example, the seat of FIG. 2 includes conventional forged spreader 30 which is comprised of forward fitting 31, tubular link 32, and forged part 33. Forged part 33 is seen to comprise portions 33a, 33b, and 33c, which are unitary with each other. Extending through a circular aperture 34 is rear base frame tube 35; and extending through circular aperture 36 in forward fitting 31 is front base frame tube 37.

Also seen in FIG. 2 are arm rest pivots 38 which serve as the attachment and pivot point for the conventional arm rests (not shown). As will be seen from the drawing, the location of arm rest pivots 38 is displaced from and different from the pivot point for the food tray mechanism as shown at 13.

Figure 3:
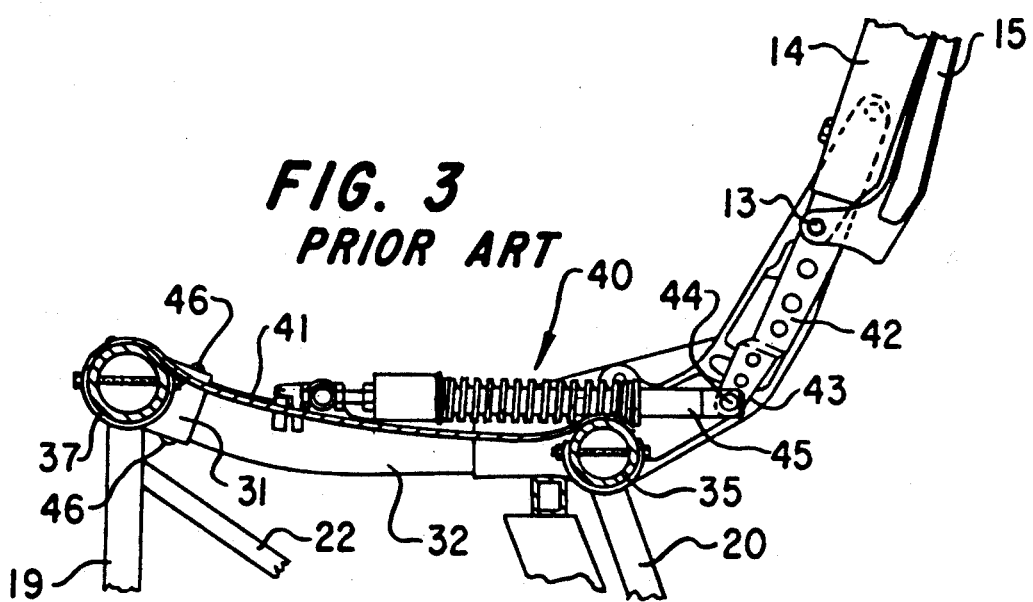
FIG. 3 is a detailed view illustrating a portion of the seat operating mechanism in accordance with the prior art.

Turning to FIG. 3, additional details of the prior art conventional seat are disclosed. These include conventional hydrolock mechanism 40 and fixed bottom pan or diaphragm 41. Also shown is interconnecting link 42 which is attached at its lower extremity 43 through pivot bolt 44 to the rear extension 45 of hydrolock mechanism 40.

As will be further observed from reference to FIG. 3, forward fitting 31 is riveted by rivets 46 to tubular link 32. Similarly, forged part 33 (FIG. 2) is riveted to rear base frame tube 35 by rivets (not shown). As will be observed from the subsequent description of the invention hereof, removable connections are employed instead of rivets, thereby rendering the structure of the instant invention more easily disassembleable.

Figure 4:
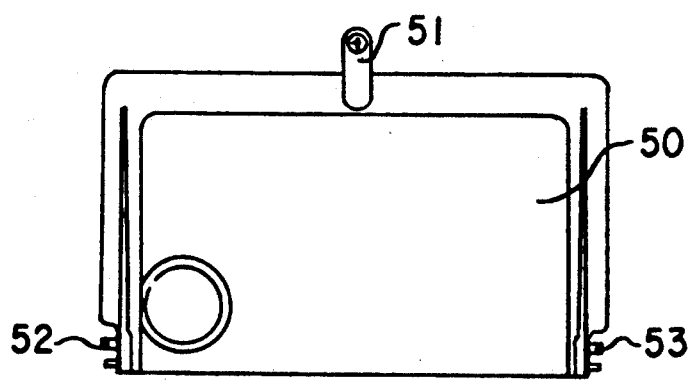
FIG. 4 is an illustrative detail showing a food tray typical of the prior art.

Now turning to FIG. 4, the food tray of the prior art will be observed. The tray is seen from the rear as would be observed by a passenger sitting in the seat to the rear of the tray and which would be served by that tray. As will be known to those skilled in the art, the tray includes tray table 50, latch 51, and pivot supports 52 and 53.

The remaining figures of the drawing illustrate the inventive features hereof and are presented so as to clearly describe the invention and to emphasize the inventive features and distinctions from the prior art.

Figure 5:
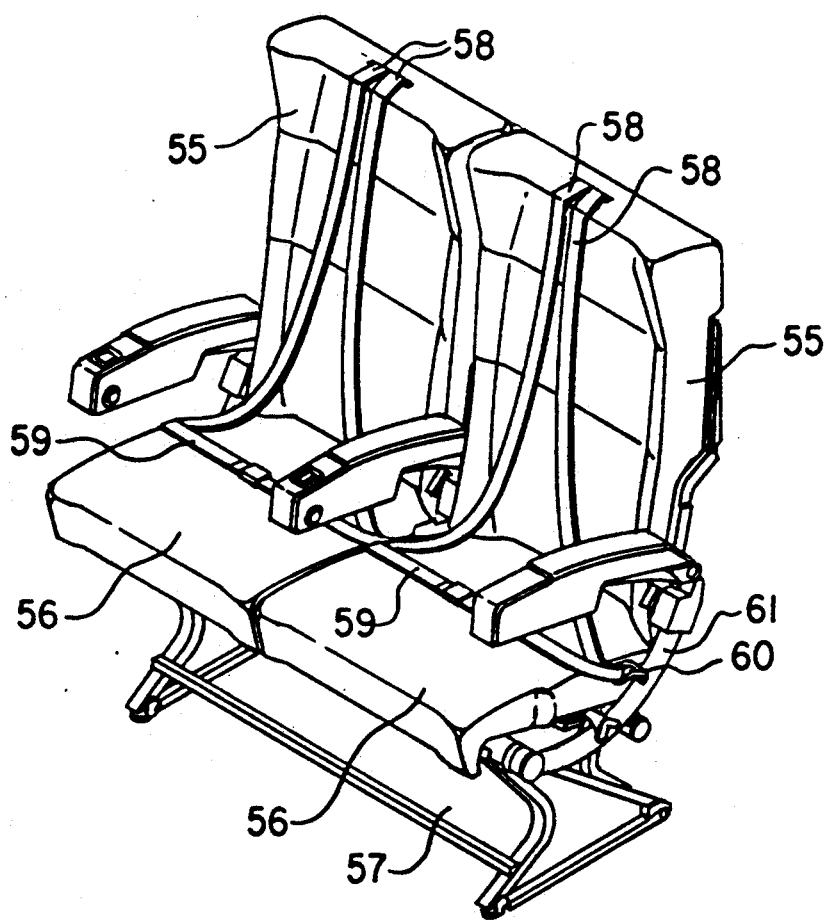
FIG. 5 is a perspective view of a pair of seats according to the principles of one of the embodiments of the invention.

FIG. 5 is a perspective view of two improved seats embodying the principles of the invention. There, it will be observed are backrest portion 55, lower seat portion 56, and base frame structure 57. As will be described in greater detail with respect to FIG. 6, base frame structure 57 includes several features which are efficacious in imparting an increased level of safety to the occupants of the seat.

Also shown in FIG. 5 are shoulder harness straps 58 which are attached at their lower extremities along with waist belts 59 to lower securing members 60 which are fastened to the spreader 61, thus providing for transmission of a major portion of any impact-produced forward crash load to the base frame structure 57.

Figure 6:
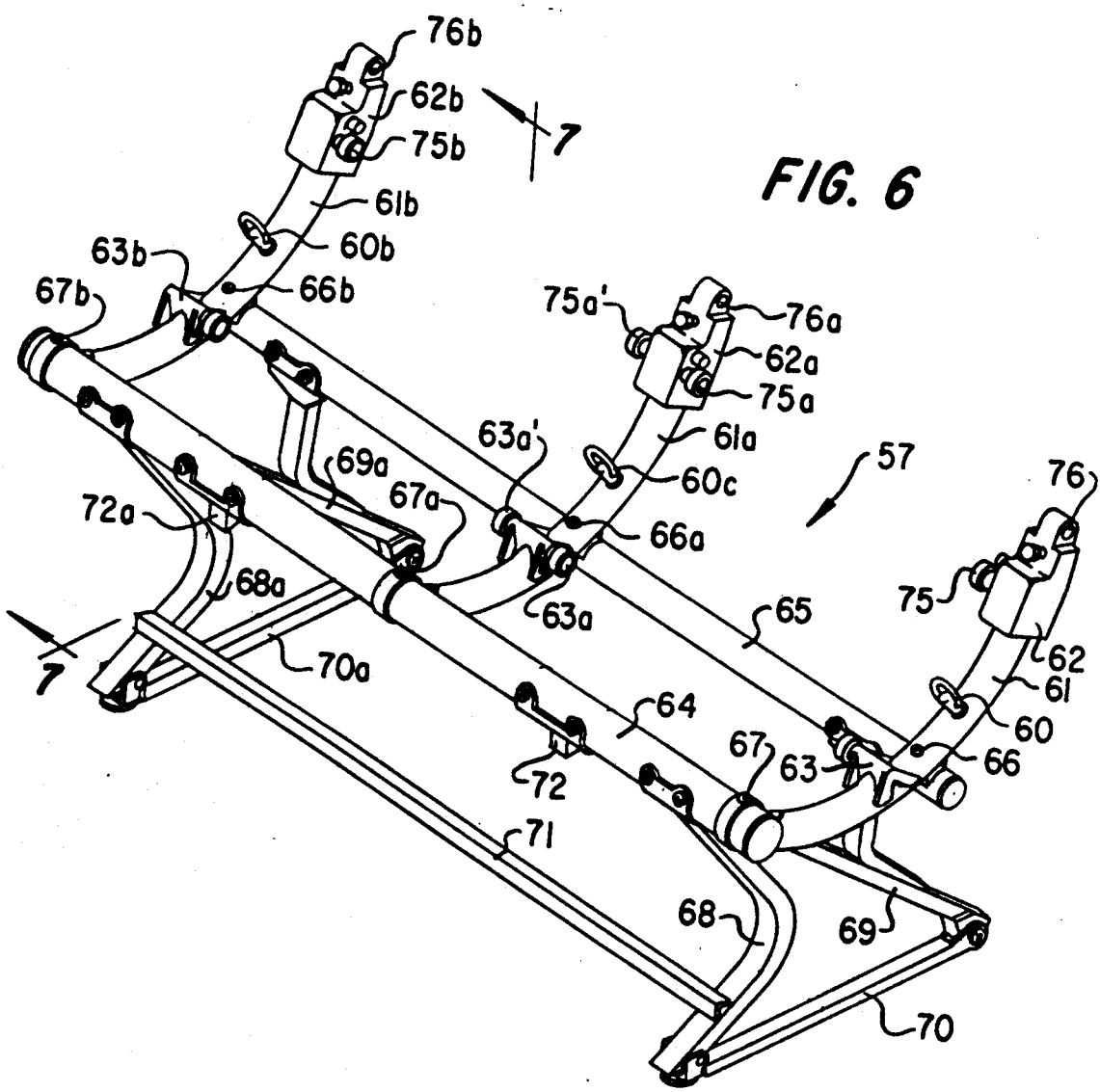
FIG. 6 is a detailed perspective view illustrating the lower stationary supporting mechanism to support a pair of seats as shown in FIG. 5.

FIG. 6 is seen to illustrate the base frame structure 57 which corresponds generally to undercarriage 18 of the prior art (FIGS. 1 and 2).

Spreader 61 is shown as being made of tubular geometry material but could be other geometric shapes such as those constructed with forged machined parts. Corresponding spreaders 61a and 61b are similar to spreader 61 except for the inclusion of fittings 62a and 62b, which are seen to differ from fitting 62 in order to accommodate the duality of the seating structure. Thus, reference to FIG. 6 will reveal that upper fitting 62b includes a follower such as roller 75b and is the mirror image of upper fitting 62 with follower roller 75, whereas fitting 62a includes a pair of followers such as rollers 75a and 75a' to correspond respectively to the matching tracks on the seat bucket 80, as will be hereinafter described in greater detail. Similarly, it will be observed that the lower follower structure includes single roller 63, dual rollers 63a and 63a', and single roller 63b.

Further reference to FIG. 6 reveals the inclusion of forward base frame tube 64 and rear base frame tube 65 which are fastened to spreaders 61, 61a and 61b by through bolts 66, 66a, 66b, 67, 67a and 67b. The importance of utilization of bolts in contrast with rivets of the prior art should be observed. As will be evident to one skilled in the art, the use of bolts facilitates maintenance and disassembly and can be readily done on site, whereas with the rivets of the prior art, it has generally been necessary to remove the entire frame and take it to a remote location, e.g., a shop, for drilling out of the rivets and disassembly.

Additional reference to FIG. 6 reveals the aforementioned structural leg members which provide an increased measure of safety in the event the seat and/or its occupant is subjected to high acceleration/deceleration forces greater than about 10 G. Thus, it will be observed that the lower structure includes the deformable energy absorbing forward legs 68 and 68a which are pre-shaped in a predetermined geometrical configuration which is particularly efficacious in absorbing energy when further bent in the forward direction as expected for most impact situations. However, as will be evident to those skilled in the art, the geometry of the legs 68 and 68a are such that in the less likely event of rearward deceleration, the members are also effective to absorb substantial amounts of energy.

The undercarriage additionally includes rear-inclined structural members 69 and 69a, and horizontal spreaders 70 and 70a, which in coaction with members 68 and 68a provide further impact load absorption in the event of high deceleration. Also included is conventional baggage restraint bar 71.

Still further reference to FIG. 6 reveals brackets 72 and 72a which are bolted to forward base frame tube 64 and which are adapted for mating with a conventional hydrolock or a mechanical seat lock. Again, it will be observed that these brackets 72 and 72a are bolted to the forward base frame tube 64 rather than riveted so as to provide increased flexibility and ease of removal and maintenance. In addition, as will be evident from the following description, the brackets 72 and 72a are positioned so as to facilitate the location of the seat lock, hydrolock or other mechanism at a level beneath the lower portion of the seat and below the frame spreader 61, thus facilitating access and maintenance.

Figure 7:
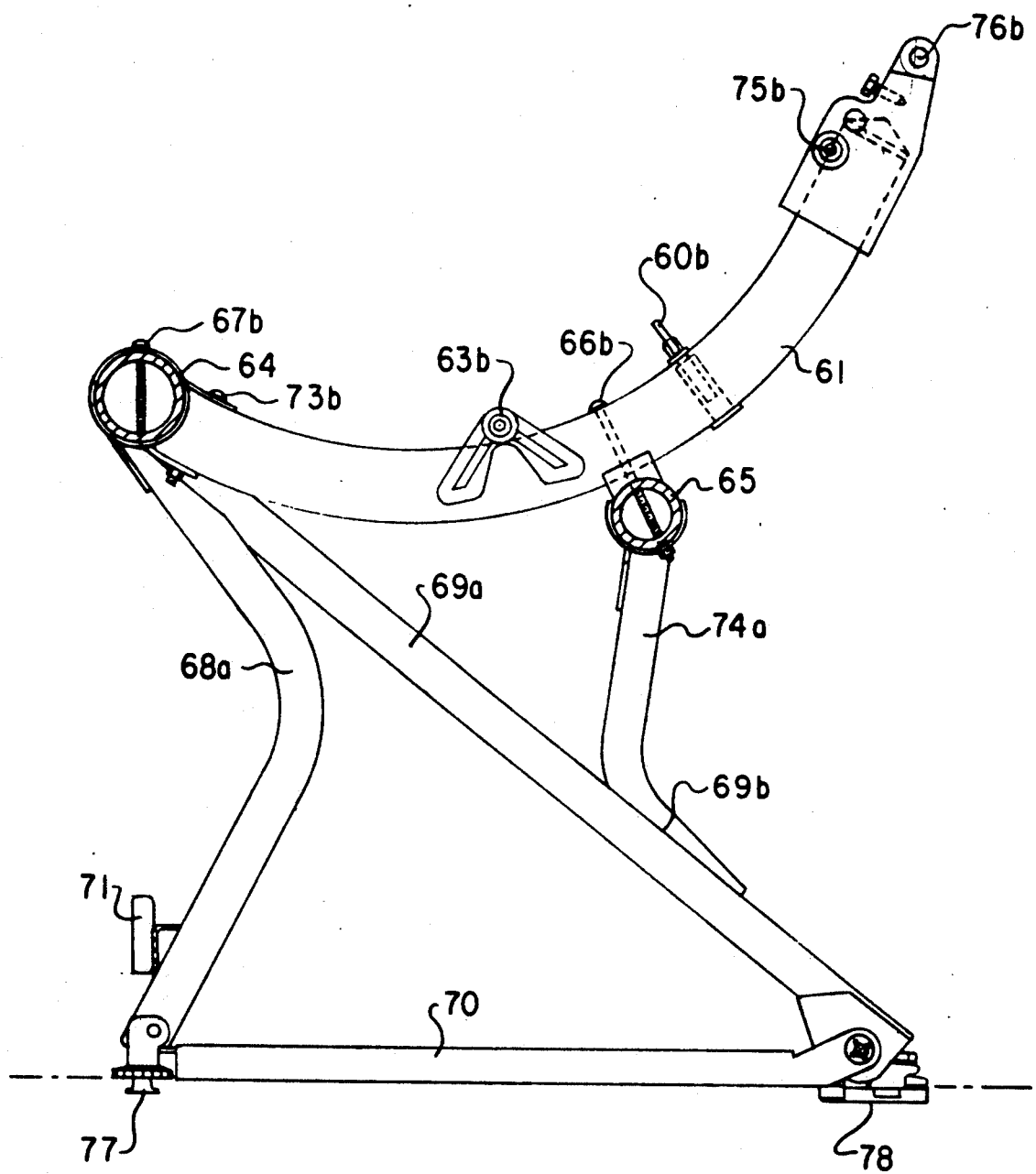
FIG. 7 is a side elevation view of a portion of the structure of FIG. 6.

Now turning to FIG. 7, which is a sectional view through the frame of FIG. 6, it will be observed that certain of the features are shown in greater detail. Thus, for example, the aforementioned bolting of the parts together is illustrated by the identification of through bolts 66b and 67b, and also by bolt 73b which is not shown in FIG. 6.

Also shown in greater detail in FIG. 7 is lower structure member 74a which is welded to member 69a along seam 69b in the conventional manner.

Further reference to FIG. 7 shows roller 75b which, as mentioned above, is provided for interaction with mating portions of the seat bucket tracks as will be described in greater detail hereinafter.

At the lower extremity of the undercarriage are located conventional fastening members 77 and 78 which mate with conventional tracks that ordinarily are positioned in the surface to which the seat is to be attached and which in turn are secured by further attachment to frame members of the support vehicle or aircraft.

As previously mentioned, the inventive principles hereof find preferred expression in two embodiments, one having a one-piece seat bucket, hereinafter referred to as minimum displacement monoarticulation, and the other having a two-piece seat bucket joined together by hinge mechanism and hereinafter referred to as minimum displacement dual articulation. However, it should be noted that the lower undercarriage base frame structure 57 (FIG. 6) is identical for both of these embodiments and is so adapted that they, together with the seat buckets, form fully interchangeable seat structures, a particularly significant feature hereof.

Figure 8:
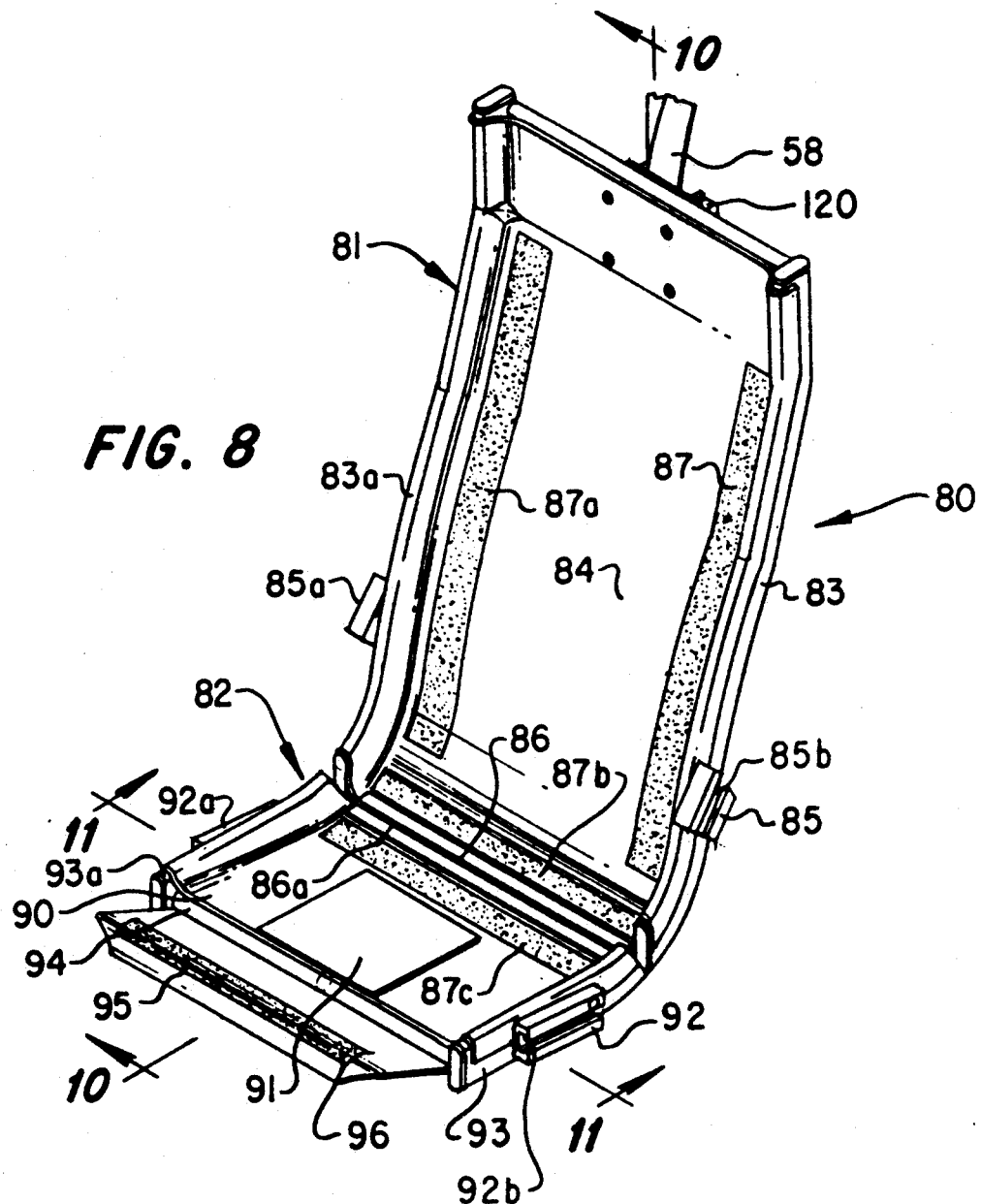
FIG. 8 is a perspective view of a seat bucket constructed in accordance with one embodiment of the invention.

Now turning to FIG. 8, the minimum displacement dual articulation embodiment seat bucket is disclosed. There, it will be observed, is shown a seat bucket 80 having two principal portions: the upper backrest portion 81 and the lower seat portion 82. Upper backrest portion 81 is further seen to include a pair of side structural members 83 and 83a, back diaphragm member 84, upper track members 85 and 85a, and a portion of interconnecting piano type hinge 86. Also positioned on back diaphragm 84 are velcro type strips 87, 87a and 87b, which are provided for attachment of readily removable cushions (not shown). Upper track members 85 and 85a each have an elongated slot 85b for receiving a corresponding one of the upper followers (e.g., roller 75, 75a, 75a' or 75b) when seat bucket 80 is on the corresponding base frame structure 57.

It should be observed that upper track members 85 and 85a control the degree to which the seat can be reclined since this is a function of the angle that the axis of the track members makes with the axis of the seat bucket side structural members 83 and 83a. Accordingly, the degree of permissible recline can be either preestablished by making the track members fixed to the side structural members or adjustable if desired through the provision of adjustability of the aforementioned angle between the axis of the track member 85 and 85a and that of the side structural members.

Lower seat portion 82 is seen to include mating portion 86a of the piano hinge interconnection, velcro type material 87c, which is attached to bottom cushion diaphragm 90 and optional reenforcement doubler 91 which may or may not be desired depending upon the strength of the material from which diaphragm 90 is constructed. It is noted that "diaphragm" as used herein is intended to mean a flexible or semi-rigid or resilient sheet of material which is supported by structural members of the seat to provide substantially uniform supporting to an overlying seat cushion or a portion thereof.

Also, as a part of lower seat portion 82 are two lower track members 92 and 92a which are provided for mating engagement with followers, e.g., the roller extensions of rollers 63, and 63a or 63a' and 63b. Lower track members 92 and 92a each have an elongated slot 92b for receiving a corresponding one of the lower followers (e.g., roller 63, 63a, 63a' or 63b) when seat bucket 80 is mounted on the corresponding support frame structure 57. Again, as with upper track members 85 and 85a, the relative angle between the axis of lower track members 92, 92a and lower seat side members 93 and 93a control the degree of lift to which the lower seat portion is subject when the seat bucket is moved.

Extending from the front portion 94 of lower seat portion 82 is flexible forward diaphragm 95 which is flexible yet sufficiently resilient to upwardly support the front portion 94 of said lower seat 82 when the seat is unloaded yet which returnably collapses downwardly or is depressible downwardly by the load of a passenger's legs as the seat bucket is moved forward. This arrangement advantageously contributes to passenger comfort by reducing or all together avoiding unwanted uncomfortable elevation of the under portions of the passenger's upper legs. This flexible forward diaphragm 95 is seen to include velcro type material strip 96 which again is included to provide ready attachment and detachment of conventional seat cushions. It also prevents unwanted sliding of the seat cushion when the bucket is moved.

Figure 9:
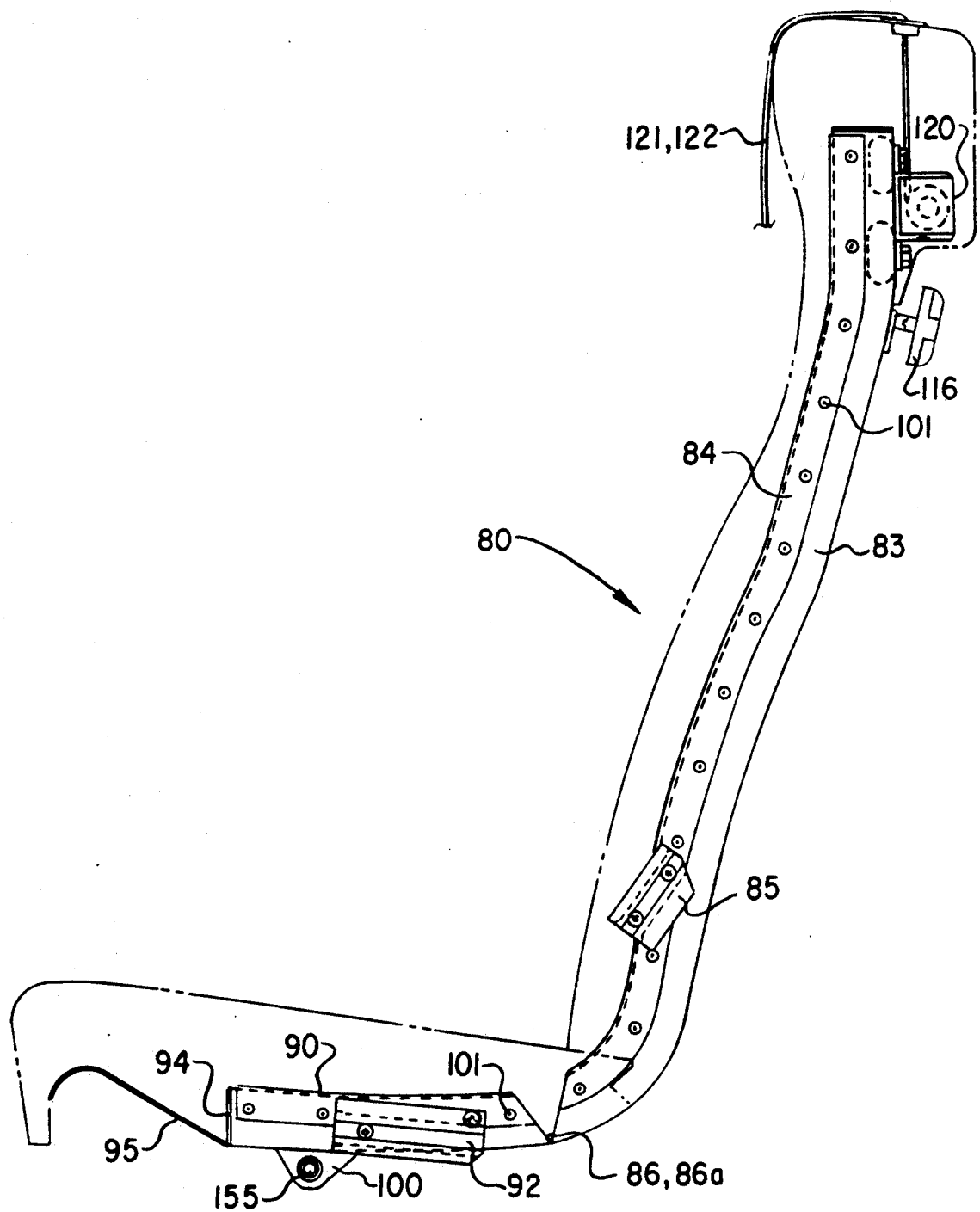
FIG. 9 is a side elevation view of the structure of FIG. 8.

Now turning to FIG. 9, a side view of the seat bucket assembly of FIG. 8 shown in greater detail. Thus, FIG. 9 depicts a fitting 100 which is adapted for mating with a single bolt 154 (FIG. 16) that is employed to attach the seat bucket assembly to a mechanical lock on the lower base frame, a particularly important feature hereof.

FIG. 9 also shows the preferred way of attaching the above-described upper and lower back and seat diaphragms 84 and 90 to side structural members 83 and 93 through the use of rivets 101.

FIG. 10 is a sectional view taken through the seat bucket assembly of FIG. 8 and shows in greater detail features of the 360° swivelable "T" member food tray latch 116 and the shoulder harness inertia reel assembly 120. These are shown in greater detail in FIGS. 12 and 14.

Now turning to FIG. 11, additional details of the seat bucket of FIG. 8 are shown. As previously mentioned, FIG. 11 is a section taken through the lower seat portion 56 (FIG. 5) and reveals in greater detail the location of the fitting 100 which provides the single bolt disconnect feature previously mentioned. This feature is shown in greater detail in FIGS. 16 and 17.

Also shown in FIG. 11 is lower seat cushion 105 which is disengagably attached to bottom cushion diaphragm 90 by the aforementioned velcro type material strips 87c and 96 shown in FIG. 8 but which for the purpose of clarity are omitted from FIG. 11.

Figure 12:
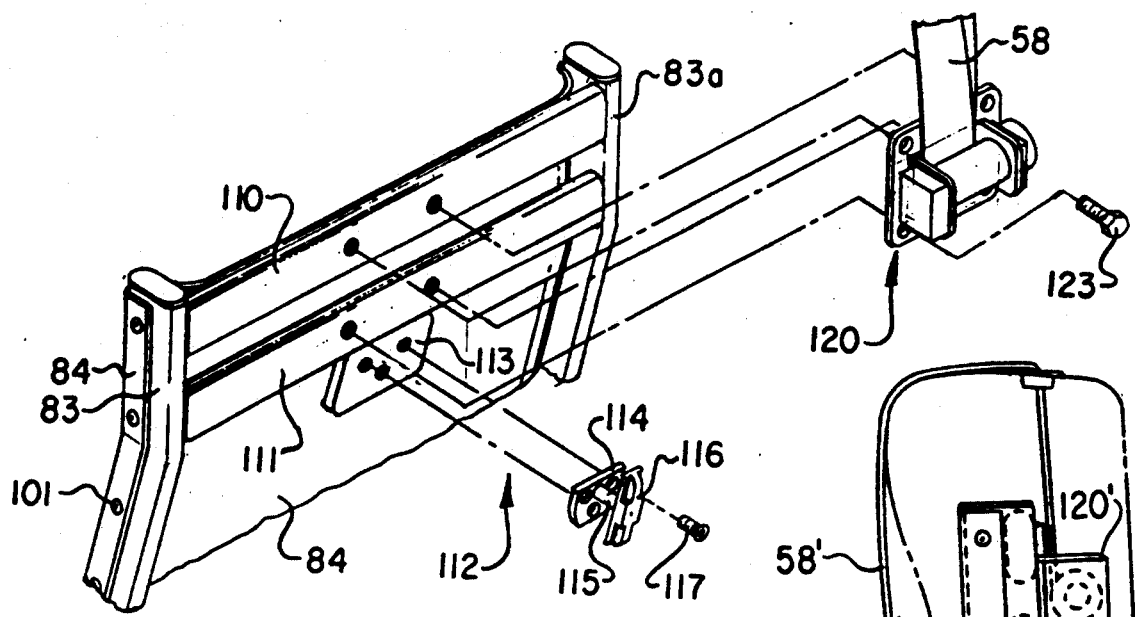
FIG. 12 is an exploded view showing details of the food tray latching mechanism and the inertia reel of the shoulder harness.

FIG. 12 shows in detail the preferred food tray latching mechanism and inertia reel for the shoulder harness.

Laterally disposed between members 83 and 83a are a pair of reenforcement members 110 and 111 which are part of the frame which serve to transfer loads from the shoulder harness and food tray latch assembly into the principal structural assembly. Food tray latching mechanism 112 is seen to include base support member 113, interconnecting bracket member 114, tubular extension 115 and a 360 degree swivelable "T" member 116. These are fastened together by a plurality of screws or other suitable fasteners 117.

Also shown in FIG. 12 is the preferred inertia reel assembly for passenger shoulder harness. This comprises a conventional inertia reel mechanism 120 to which straps 58. Mechanism 120 is attached to reinforcement members 110 and 111 by four bolts 123.

Figure 13:
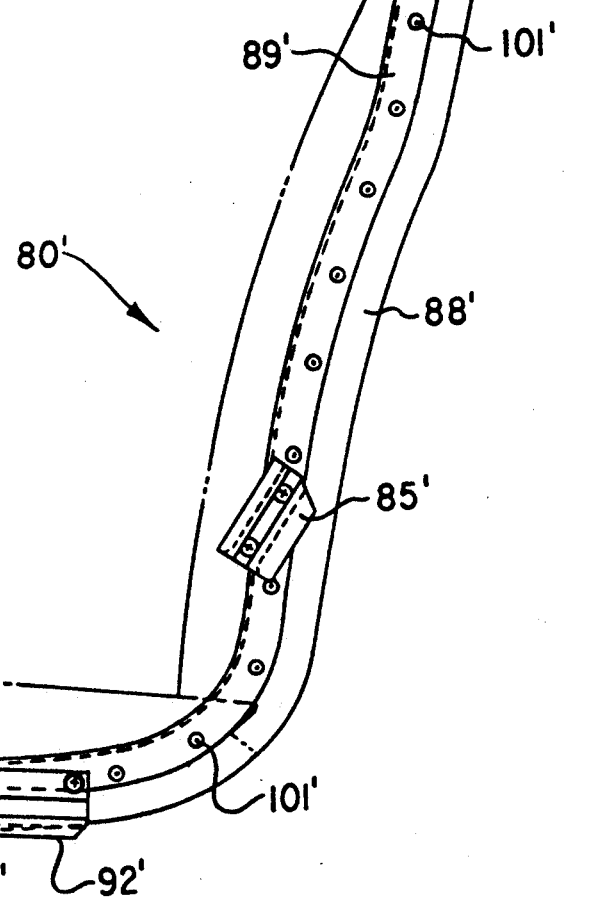
FIG. 13 is a side elevation of an alternate embodiment of the invention employing monoarticulation.

FIG. 13 illustrates the single articulation embodiment of the seat bucket to which reference is heretofore made. As will be observed from an inspection of the figure, the seat bucket and associated components are identical to those depicted and described in respect of FIG. 9 except for the hinge mechanism 86, 86a and for the fact that the seat bucket of FIG. 9 is configured in two separate portions instead of one section as is shown for FIG. 13. Thus, in FIG. 13, the entire seat bucket is fabricated as one unitary structure and the hinge 86, 86a is eliminated. In consequence of this, parts in FIG. 13 which are similar to those of FIG. 9 are identified with the same numerals but with the inclusion of the prime symbol.

FIG. 14 shows in detail the preferred form of the food tray mechanism according to the present invention. Reference to FIGS. 14 and 6 together with FIG. 2 of the prior art will reveal an additional feature according to the inventive principles hereof. Thus, whereas in the prior art (FIG. 2) the attachment of the food tray supporting mechanism is positioned at a location approximating that illustrated by pivot bolt 13, a position significantly lower than the arm rest pivot 38, a fact which requires lengthy food tray supporting arms that intrude unduly into the passenger space, the pivoting location and attaching point for the food tray arms 132–132a of the instant invention are located at a higher position such as that shown by apertures 76, 76a and 76b of FIG. 6. Accordingly, the food tray, when deployed, intrudes substantially less into the passenger space.

In the preferred embodiment, apertures 76, 76a and 76b also serve as swivel points for the rear portions of seat arms 55a–55c (FIG. 5).

In FIG. 14, a pair of pins 130 and 130a are employed to connect the food tray mechanism to the base frame structure 57. These pins may be secured by any conventional item such as a bolt or a snap ring (not shown). When assembled, the arms 132 and 132a are positioned such that apertures 131 and 131a are in axial alignment with apertures 76–76b (FIG. 6) and pins 130–130a are then inserted through these aligned apertures and are fastened with the aforementioned snap rings or the like, thus affixing the food tray assembly to the base frame structure 57.

Arms 132 and 132a include swiveling recesses 133–133a. These mate with conventional swiveling projections 134 and 134a to permit swiveling of the tray 135 between the in-use and storage positions. Conventional projecting pins 136 and 136a provide convenient means of stopping the swiveling of the tray when in its in-use position.

Included within the main body of tray 135 is vertical slot 137 which is provided to permit relative movement of the tray and the latching mechanism when the seat is moved between its upright and its reclined position. As will be evident from the foregoing description, since the swivelable "T" member 116 is attached to the seat bucket, and since the tray is attached to the base frame structure 57, movement of the seat between its upright and reclined positions will result in a relative movement between the tee member 116 and the tray 135. Provision of slot 137 permits such relative movement without disturbing the function.

FIG. 15 is a partial side elevation view showing the details of the connection and deployment of the tray table. As will be observed from the figure, the arms 132 and 132a swivel about pins 130 and 130a and are limited in their travel by food tray stop pins 140 (the food tray stop pin for arm 132a, which is not shown in the side view of FIG. 15, would be located according to a mirror image of 140 as shown). Similarly, tray 135 swivels about extension 134-134a and is restrained in its travel by slot 141 and mating pin 137.

Figure 16:
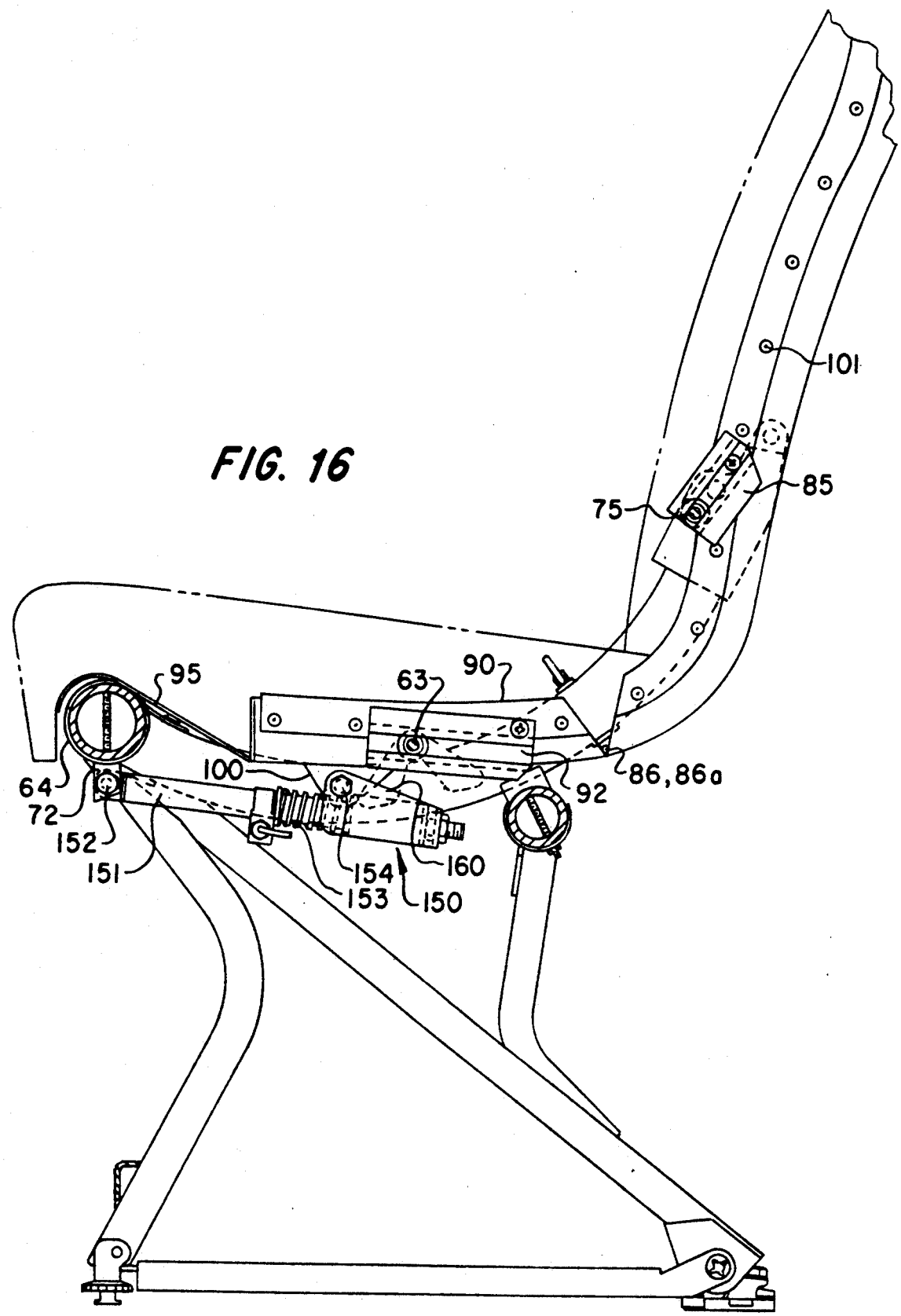
FIG. 16 is a side elevational view partly cut away to illustrate the improved fastening features in accordance with the invention.

FIG. 16 shows the seat bucket in place and fastened to the lower supporting frame. There, it will also be observed, is depicted the hydrolock mechanism 150 which is shown in the position it assumes when the seat is in its raised or vertical position. Connecting forward extension 151 of hydrolock mechanism 150 to the forward base frame tube 64 is bolt 152 which securely fastens the forward extension 151 of hydrolock 150 to bracket 72.

Connecting the rear end 153 of hydrolock mechanism 150 to the seat bucket is bolt 154 which projects through aperture 155 (FIG. 11) on bracket 100 and a mating aperture on extension 160 from hydrolock 150.

It should be noted that in accordance with one of the principal features hereof that the entire seat bucket assembly can be detached and removed from the lower base frame by the removal of either of bolts 152 or 154, thus facilitating disassembly for removal and/or maintenance. This is in contrast with the prior art in which a plurality of through bolts and other fasteners are required to be detached before the corresponding portions of the seats can be removed.

Now turning to FIG. 17, the seat of FIG. 16 is shown in the reclined position. From a comparison of FIGS. 16 and 17, it will be observed that the positions of rollers 63 and 75 within tracks 85 and 92 have changed. As the seat is reclined, roller 75 rises within track 85, and correspondingly roller 63 moves rearwardly within track 92. It should also be observed that extension 95 has projected forwardly and has deformed downwardly to a configuration around forward base frame tube 64. It should also be noted that in the single articulated embodiment (FIG. 13) of the invention the seat, when reclined, maintains its precise geometrical shape, the seat bucket being of unchanging geometry.

Although the invention hereof has been described by way of example of preferred embodiments, it will be evident that other adaptations and modifications may be employed without departing from the spirit and scope thereof. For example, a conventional mechanical locking mechanism could readily be employed instead of the aforementioned hydrolock.

The terms and expressions employed herein have been used as terms of description and not of limitation; and thus, there is no intent of excluding equivalents, but on the contrary, it is intended to cover any and all equivalents that may be employed without departing from the spirit and scope of the invention.

What is claimed is:

1. A chair, comprising, in combination:
a support frame;
a seat removably mounted with the support frame;
follower means located on one of said support frame and said seat;
guide means located on the other one of said support frame and said seat and adapted for mating engagement with said follower means to support said seat in slidable relationship to said support frame such that said seat is movable between a substantially upright position and a reclining position;
a tray having a relatively flat major surface for supporting articles thereon, said tray having a slot therein;
attachment means for attaching said tray to said support frame such that said tray is moveable between a first position at which said tray is secured when not in use and a second position at which said tray is deployed for use, said seat being moveable relative to said support frame and relative to said tray when said seat is moved between said substantially upright position and said reclining position; and
securing means carried on said seat and being engageable with said slot to secure said tray in said first position, said securing means being disengageable from said slot to release said tray for movement to said second position, said securing means being moveable within said slot when said tray is in said first position and said seat is moved between said substantially upright position and said reclining position, said securing means including a latch assembly having a tubular member projecting from said seat and a swiveable latch member located at one end of said tubular member, said tubular member extending through said slot in said tray when said tray is in said first position, and latch member being adapted to be swiveled to a transverse position with respect to said slot to retain said tray in said first position and being adapted to be swiveled to a longitudinal position relative to said slot to release said tray to be moved from said first position to said second position.

2. The chair of claim 1 wherein said attachment means includes a pair of arms swiveably connecting said tray to said support frame, said chair further including a pair of armrests connected to said chair on respective opposed sides of said chair, said pair of arms being connected to said chair at the respective points of connection of said armrest to said chair.

3. The chair of claim 1 wherein said slot is oriented along a vertical axis, the length of said slot along said vertical axis defining the travel of said seat between said substantially upright position and said reclining position.

4. The chair of claim 1 wherein said seat includes a generally upstanding backrest portion, said tubular member projecting from said backrest portion for engaging said slot when said tray is in said first position, said slot being elongated, said tubular member being moveable along a longitudinal axis of said slot such that said backrest portion is moveable relative to said tray in a direction parallel to said longitudinal axis.

5. A chair, comprising, in combination;
a support frame;
a seat;
mounting means for mounting said seat in slidable relationship to said support frame such that said seat is moveable between a substantially upright position and a reclining position, said support frame including a plurality of supporting legs, at least one of said supporting legs being located on a front portion of said support frame, said at least one of said supporting legs being bent at a predetermined angle and being deformable from said predetermined angle to absorb acceleration/deceleration forces when said chair is subjected to acceleration/deceleration forces greater than a predetermined level;

a tray having a relatively flat major surface for supporting articles thereon, said tray having a slot therein;

attachment means for attaching said tray to said support frame such that said tray is moveable between a first position at which said tray is secured when not in use and a second position at which said tray is deployed for use, said seat being moveable relative to said support frame and relative to said tray when said seat is moved between said substantially upright position and said reclining position; and securing means carried on said seat and being engageable with said slot to secure said tray in said first position, said securing means being disengageable from said slot to release said tray for movement to said second position, said securing means being moveable within said slot when said tray is in said first position and said seat is moved between said substantially upright position and said reclining position, said securing means including a latch assembly having a tubular member projecting from said seat and a swivelable latch member located at one end of said tubular member, said tubular member extending through said slot in said tray when said tray is in said first position, said latch member being adapted to be swiveled to a transverse position with respect to said slot to retain said tray in said first position and being adapted to be swiveled to a longitudinal position relative to said slot to release said tray to be moved from said first position to said second position.

6. The chair of claim 5 wherein said slot is oriented along a vertical axis, the length of said slot along said vertical axis defining the travel of said seat relative to said tray.

7. The chair of claim 5 wherein said seat includes a generally upstanding backrest portion, said tubular member projecting from said backrest portion for engaging said slot when said tray is in said first position, said slot being elongated, said tubular member being moveable along a longitudinal axis of said slot such that said backrest portion is moveable relative to said tray in a direction parallel to said longitudinal axis.

8. A chair, comprising: in combination;
a support frame;
a seat having a lower seat portion and a backrest portion extending generally upwardly from said lower seat portion;
mounting means for mounting said seat in slidable relationship to said support frame such that said seat is moveable relative to said support frame between a substantially upright position and a reclining position;
a resilient member located beneath said lower seat portion, said resilient member being depressible relative to said lower seat portion when said seat is in the reclining position;
a tray having a relatively flat major surface for supporting articles thereon, said tray having a slot therein;
attachment means for attaching said tray to said support frame such that said tray is moveable between a first position at which said tray is secured when not in use and a second position at which said tray is deployed for use, said seat being moveable relative to said support frame and relative to said tray when said seat is moved between said substantially upright position and said reclining position; and
securing means carried on said seat and being engageable with said slot to secure said tray in said first position, said securing means being disengageable from said slot to release said tray for movement to said second position, said securing means being moveable within said slot when said tray is in said first position and said seat is moved between said substantially upright position and said reclining position, said securing means including a latch assembly having a tubular member projecting from said seat and a swivelable latch member located at one end of said tubular member, said tubular member extending through said slot in said tray when said tray is in said first position, said latch member being adapted to be swiveled to a transverse position with respect to said slot to retain said tray in said first position and being adapted to be swiveled to a longitudinal position relative to said slot to release said tray to be moved from said first position to said second position.

9. The chair of claim 8 further including a pair of armrests connected to said chair on respective opposed sides thereof, said chair further including a pair of arms swivelably connecting said tray to said chair, said pair of arms being connected to said chair at the respective points of connection of said armrests to said chair.

10. The chair of claim 8 wherein said slot is oriented along a vertical axis, the length of said slot along said vertical axis defining the movement of said seat between said substantially upright position and said reclining position.

11. The chair of claim 8 wherein said tubular member projects from said backrest portion for engaging said slot when said tray is in said first position, said slot being elongated, said tubular member being moveable along a longitudinal axis of said slot such that said backrest portion is moveable relative to said tray in a direction parallel to said longitudinal axis.

12. A chair, comprising, in combination:
a support frame;
a seat;
mounting means for mounting said seat in slidable relationship to said support frame such that said seat is moveable relative to said support frame between a substantially upright position and a reclining position;
a tray having a relatively flat major surface for supporting articles thereon, said tray having a slot therein;
attachment means for attaching said tray to said support frame such that said tray is moveable between a first position at which said tray is secured when not in use and a second position at which said tray is deployed for use, said seat being moveable relative to said support frame and relative to said tray when said seat is moved between said substantially upright position and said reclining position; and securing means carried on said seat and being engageable with said slot to secure said tray in said first position, said securing means being disengageable from said slot to release said tray for movement to said second position, said securing means being moveable within said slot when said tray is in said first position and said seat is moved between said substantially upright position and said reclining position, said securing means including a latch assembly having a tubular member projecting from said seat and a swivelable latch member located at one end of said tubular member, said tubular member extending through said slot in said tray when said tray is in said first position, said latch member being adapted to be swiveled to a transverse position with respect to said slot to retain said tray in said first position and being adapted to be swiveled to a longitudinal position relative to said slot to release said tray to be moved from said first position to said second position.

13. The chair of claim 12 wherein said slot is oriented along a vertical axis, the length of said slot along said vertical axis defining the movement of said seat between said substantially upright position and said reclining position.

14. The chair of claim 12 wherein said seat includes a generally upstanding backrest portion, said tubular member projecting from said backrest portion for engaging said slot when said tray is in said first position, said slot being elongated, said tubular member being moveable along a longitudinal axis of said slot such that said backrest portion is moveable relative to said tray in a direction parallel to said longitudinal axis.

* * * * *